Figures 1, 2:
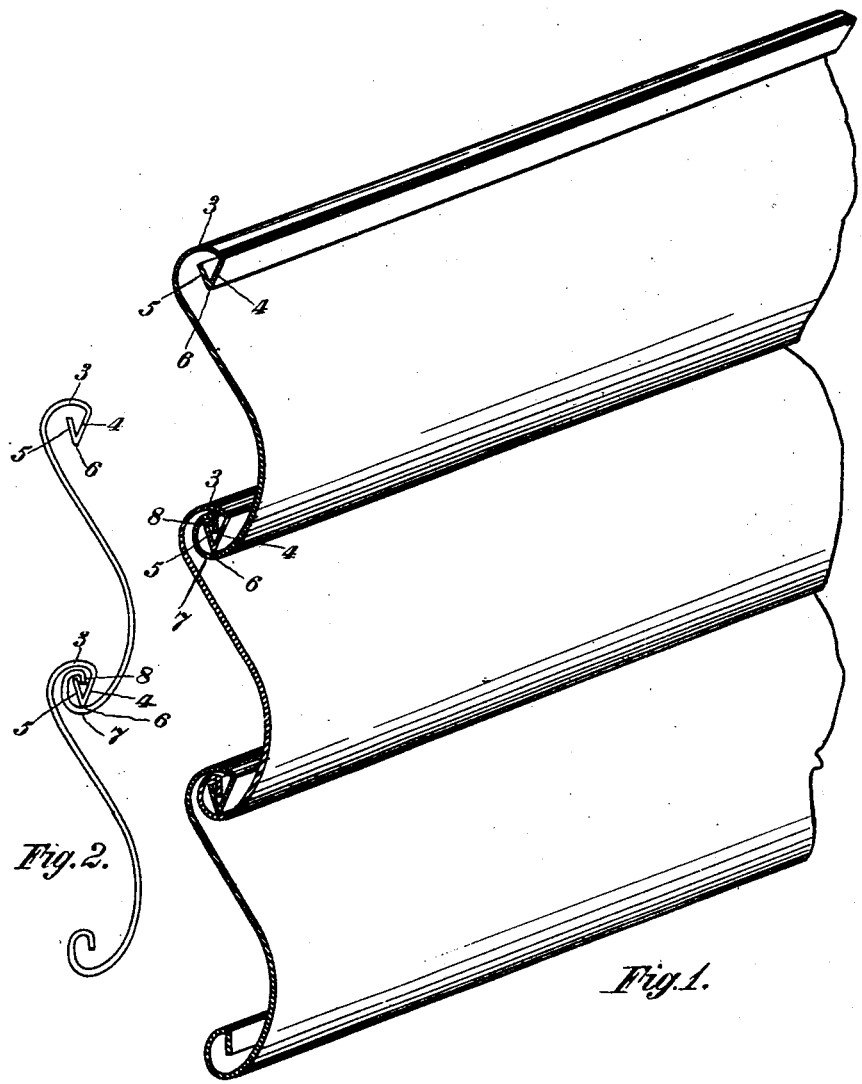

No. 876,593. PATENTED JAN. 14, 1908.
A. RUSH.
FLEXIBLE OR ROLLING METALLIC SHUTTER.
APPLICATION FILED MAY 31, 1907.

Witnesses
Benj. Finckel
Nathaniel G. Ward

Inventor
ALBERT RUSH
by Finckel & Finckel
his Attorneys

UNITED STATES PATENT OFFICE.

ALBERT RUSH, OF COLUMBUS, OHIO.

FLEXIBLE OR ROLLING METALLIC SHUTTER.

No. 876,593.  Specification of Letters Patent.  Patented Jan. 14, 1908.

Application filed May 31, 1907. Serial No. 376,505.

*To all whom it may concern:*

Be it known that I, ALBERT RUSH, a citizen of the United States, residing at Columbus, in the county of Franklin and State of Ohio, have invented a certain new and useful Improvement in Flexible or Rolling Metallic Shutters, of which the following is a specification.

The object of this invention is to provide an improved construction of flexible or rolling shutter or curtain and of slats for the manufacture of the same, the purpose being more especially to secure great strength in the slats and their parts, and more smoothly operating bearings at their junction.

The invention resides in the construction hereinafter described and claimed.

In the accompanying drawing—Figure 1 is a sectional-perspective view of a fraction of a shutter or curtain constructed with my improved slats; and Fig. 2 is another view in end elevation of two slats joined together.

Because rolling curtains constructed of metallic slats are now in very general and common use it is unnecessary to illustrate and describe here more than the peculiar construction of slat and the manner of its junction with other slats.

The slat, which is usually made out of a strip of sheet metal passed through rolls to give it the required shape, is, generally speaking, of a modified S-form in cross section with its edges formed in peculiarly shaped hooks and bearings. The upper portion of the slat as herein shown is bent to form a hook or roll, as seen at 3, that has its edge provided with a member of V-shaped cross section, said member having, in the instance shown, flat sides 4 and 5. The lower edge of this V-shaped member is, owing to the fact that the metal is bent to form it, slightly rounded and therefore smooth, as seen at 6. This lower edge or corner, therefore, presents a bearing that moves easily on a smooth metallic surface, or, reversely, permits a smooth metallic surface to move under it. The lower portion of the slat is bent to form a roll or hook preferably of shorter radius, as seen at 7, than the curve of the roll at the upper portion of the slat and so as to fit within it, and said lower roll terminates in a downwardly extending flat lip or tongue 8. Slats of this general construction can be joined to form the shutter or curtain either by sliding the hook members or bearings one into or onto another, or by rolling one slat over with reference to the other, the hook members in this last mode being first placed with reference to each other so that upon rolling the slat the hook of the rolled slat will take into that of the others and the bearing come together, but by making the lip or tongue 8 sufficiently deep as compared with the space between the edge of the V-shaped member and the body of the roll or hook adjacent to it, the slats may be made joinable and separable only by sliding them with reference to each other.

When properly joined the lip or tongue 8 on the upper edge of a slat projects more or less into the trough-like cavity of the V-shaped member at the upper portion of the slat next below and serves to prevent or help prevent accidental separation of the slats. In suspended position the lower edge of the V-shaped member rests upon the inner surface of the curved roll of the lower portion of the slat next above, and because both these surfaces are comparatively smooth the slats rock with great freedom with reference to each other and into the angular position which they assume with reference to each other when the curtain or shutter is rolled up on a roller. But the slats are kept from any very considerable movement while in erect position horizontally with reference to each other by reason of the projection of the lip or tongue 8 into the cavity of the V-shaped member.

The form of the parts constituting the joints not only promotes great freedom of their action but also strengthens them and prevents their distortion.

What I claim and desire to secure by Letters Patent is:

1. A flexible shutter or curtain constructed chiefly of slats each consisting of a strip of sheet metal having its upper portion provided with a bearing member substantially V-shaped in cross section and its lower portion provided with a roll having a downwardly extending tongue to enter the cavity of such V-shaped member in an adjoined slat.

2. A flexible shutter or curtain constructed chiefly of slats each consisting of a strip of sheet metal having its upper portion provided with a bearing member substantially V-shaped in cross section and its lower portion provided with a roll and a downwardl extending tongue to enter the cavity of the V-shaped member on an adjoined slat, the said V-shaped member and tongue being on opposite sides of the slat.

3. A flexible shutter or curtain constructed chiefly of slats each consisting of a strip of sheet metal having its upper portion provided with a bearing member V-shaped in cross section with flat sides, and its lower portion provided with a roll and a downwardly extending tongue to enter the cavity of the V-shaped member on an adjoined slat.

4. A flexible shutter or curtain constructed chiefly of slats each consisting of a strip of sheet metal having its upper portion provided with a bearing member substantially V-shaped in cross section, and its lower portion provided with a roll and a downwardly extending flat tongue to enter the cavity of the V-shaped member of an adjoined slat.

5. A slat for the construction of a flexible shutter or curtain, consisting of a strip of sheet metal having its upper portion provided with a bearing member substantially V-shaped in cross section and its lower portion provided with a roll having a downwardly extending tongue to enter the cavity of such a V-shaped member on a similar slat.

6. A slat for the construction of flexible shutters or curtains consisting of a strip of sheet metal having its upper portion provided with a bearing member V-shaped in cross section and its lower portion provided with a roll and a downwardly extending tongue to enter the cavity of such a V-shaped member on a similar slat, the said V-shaped member and tongue being on opposite sides of the slat.

7. A slat for the construction of a flexible shutter or curtain consisting of a strip of sheet metal having its upper portion provided with a member V-shaped in cross section having flat sides, and its lower portion provided with a roll and a downwardly extending tongue to enter the cavity of such a V-shaped member in a similar slat.

8. A slat for the construction of a flexible shutter or curtain consisting of a strip of sheet metal having its upper portion provided with a member substantially V-shaped in cross section, and its lower portion provided with a roll and a downwardly extending flat tongue to enter the cavity of such a V-shaped member on a similar slat.

ALBERT RUSH.

Witnesses:
CHARLES R. MORTEN,
BENJAMIN FINCKEL.